United States Patent
Kawaguchi

[11] Patent Number: 6,163,601
[45] Date of Patent: Dec. 19, 2000

[54] COMMUNICATIONS DATA TERMINAL CAPABLE OF PERFORMING A PLURALITY OF COMMUNICATION CONTROLS

[75] Inventor: Tetsuya Kawaguchi, Isehara, Japan

[73] Assignee: Ricoh Company, Ltd., Tokyo, Japan

[21] Appl. No.: 09/088,536

[22] Filed: Jun. 1, 1998

[30] Foreign Application Priority Data

Jun. 3, 1997 [JP] Japan ..................... 9-160547

[51] Int. Cl.[7] .............. H04M 11/00; H04N 1/00
[52] U.S. Cl. ..................... 379/100.17; 358/435
[58] Field of Search .................... 358/434–436, 358/438–440, 442, 400, 437, 441; 379/93.31–93.34, 100.05, 100.17, 100.01, 100.06, 100.09; 375/222; 370/276–279, 293–296, 465–468

[56] References Cited

U.S. PATENT DOCUMENTS

| | | | |
|---|---|---|---|
| 5,721,731 | 2/1998 | Yoshida | 370/296 |
| 5,751,441 | 5/1998 | Morimoto | 358/435 |
| 5,812,281 | 9/1998 | Mukai et al. | 358/435 |
| 5,943,364 | 8/1999 | Yoshida | 375/222 |

*Primary Examiner*—Curtis A. Kuntz
*Assistant Examiner*—George Eng
*Attorney, Agent, or Firm*—Cooper & Dunham LLP

[57] ABSTRACT

A communications data terminal apparatus that is capable of performing a plurality of communications controls includes a first communications controller performing communications functions including V.8 and V.34 procedures, a second communications controller performing a modem function having a data signaling rate slower than that of the first communications controller. A timer counts a predetermined time period after the first controller sends a CM signal during a calling mode, or a JM signal during a receiving mode. A system controller is used to 1) determine whether the first communications controller receives the JM signal from a remote data terminal apparatus within the predetermined time; 2) stop sending the CM signal and receive a DIS signal when it is determined that no JM signal is received within the predetermined time when the apparatus is operating in the during the calling mode; 3) determines whether the first communications controller receives a CJ signal within the predetermined time; and 4) stop sending the JM signal and sends the DIS signal when no CJ signal is received within the predetermined time when the apparatus is operating in receiving mode.

15 Claims, 9 Drawing Sheets

COMMUNICATIONS DATA TERMINAL CAPABLE OF PERFORMING A PLURALITY OF COMMUNICATION CONTROLS

BACKGROUND

1. Field

The disclosed apparatus and method relates to a facsimile apparatus, and more particularly to a facsimile apparatus that is capable of performing a plurality of standardized communications controls.

2. Discussion of the Related Art

There have been developed communications terminals such as facsimile apparatus that perform communications operations complied with communications protocols defined by recommendations V.8 and V.34 of the ITU-T (international telecommunication union-telecommunication standardization sector). The V.8 procedure defines procedures for starting sessions of data transmission over a PSTN (public switched telephone network) and that communications complying with the V.8 procedure are performed in a full duplex communications mode. The V.34 defines a modem operating at data signaling rates of up to 33,600 bps (bits per second) for use on the PSTN and on leased point-to-point 2-wire telephone-type networks.

The V.8 procedure defines various start-up signals to be transmitted between calling and called terminals over the PSTN. Examples of these signals include a CM (call menu) for calling a menu, a JM (joint menu) for jointing menus, and a CJ (call joint) for indicating a detection of the JM and a termination of the CM. Transmission of these signals is performed in either a full or half duplex transmission mode, depending upon transmission conditions.

Communications between terminals complying with the V.8 procedure in the full duplex transmission mode, typically requires a start-up procedure in which the calling and called terminals sequentially exchange the start-up signals. In addition, the called terminal sends an ANSam signal (answer amplitude-modulated) for designating the full duplex transmission mode and, after a certain period of time, the JM signal. Upon receiving the ANSam signal the calling terminal sends the CM signal and then receives the JM signal. After receiving the JM signal the calling terminal sends the CJ signal, and upon receiving the CM signal the called terminal sends the JM signal and then receives the CJ signal.

In general, communications between terminals each having a modem use a series of communications protocols called V series modem recommendations. The V series modem recommendations define the communications protocols with respect to the physical layer, and include the following protocols: V.17 for up to 14,400 bps; V.21 for data signaling rates of up to 300 bps; V.22 for up to 1,200 bps; V.22bis for up to 2,400 bps; V.29 for up to 9,600 bps; V.32 for up to 9,600; V.32bis for up to 14,400; and V.34 for up to 33,600 bps, for example. In particular, the V.17 and V.29 protocols have been used for the facsimile apparatus. Most modems that are presently in the market are designed in accordance with the above-mentioned V series modem recommendations. For example, communications between terminals each having a modem complying with the V.34 protocol can communicate at data signaling rates of 33,600 bps (optional), 31,200 bps (optional), 28,800 bps, 26,400 bps, 24,000 bps, 21,600 bps, 19,200 bps, 16,800 bps, 14,400 bps, 12,000 bps, 9,600 bps, 7,200 bps, 4,800 bps, and 2,400 bps. Before starting the data communications, the modems of the terminals automatically select the fastest rate from among data signaling rates applicable to the conditions of the telephone line at the time of performing the communications.

Figure 8:
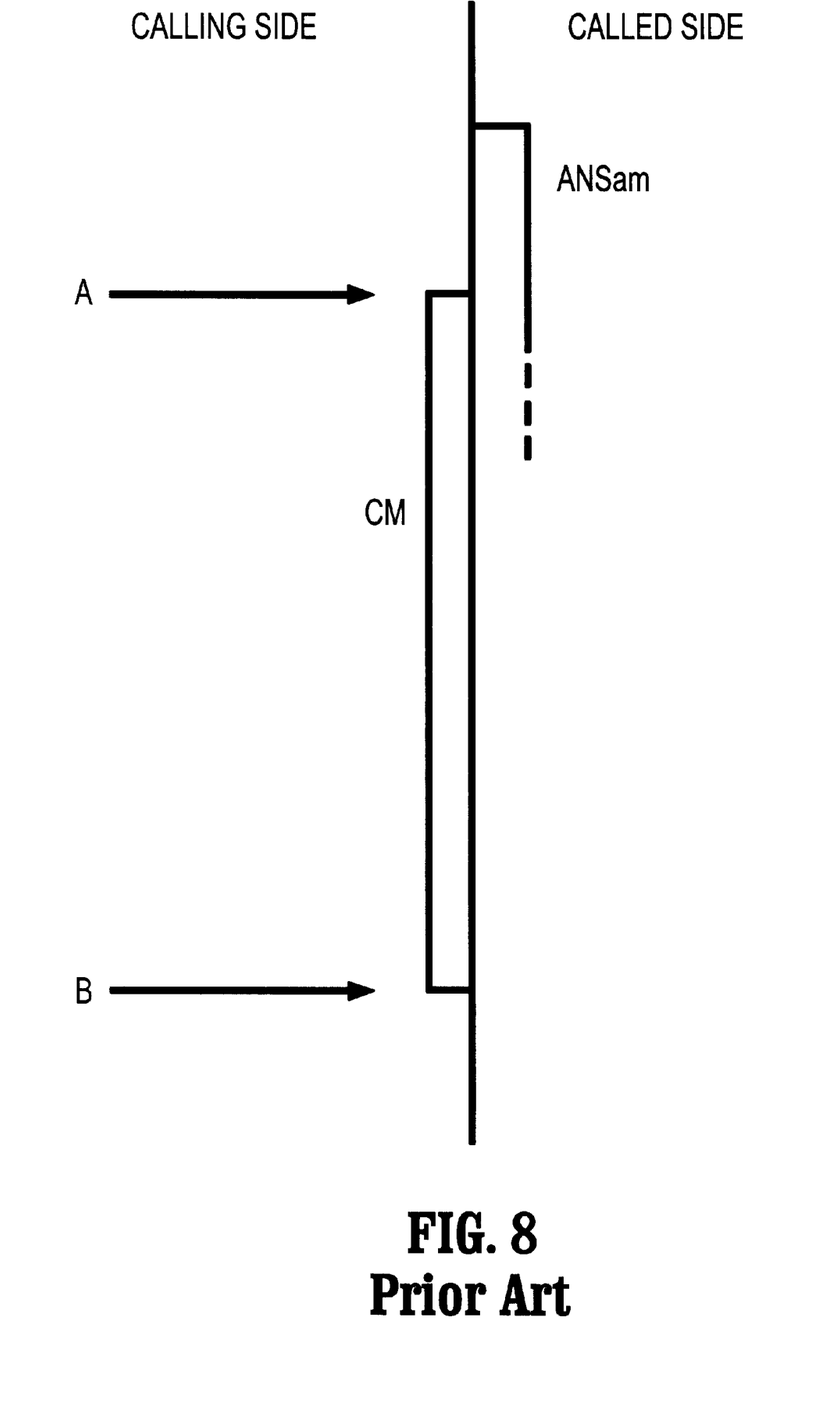
FIG. 8 is an illustration for explaining conventional communications procedure when a facsimile apparatus fails to receive a JM signal.

In facsimile apparatus that have a communications controller, such as a modem, for controlling communications in accordance with the V.8 and V.34 procedures, a transmission error during the V.8 start-up procedure may cause a relatively long waiting state and result in a communications failure that causes a line disconnection. More specifically, a transmission error may occur for any reason during the V.8 start-up procedure and a calling facsimile apparatus, for example, becomes unable to receive the JM signal after starting a timer T1 for measuring a time-out period. In this case, the calling facsimile apparatus inevitably continues to send the CM signal until a time-out period, typically preset to 35 seconds, is passed. After the time-out period of 35 seconds, a relatively long time to wait, the state is then regarded as a communications failure. FIG. 8 illustrates the communications procedure of this case, in which the start of the timer T1 is indicated by the arrow A and the time-out of the timer T1 is indicated by the arrow B.

Figure 9:
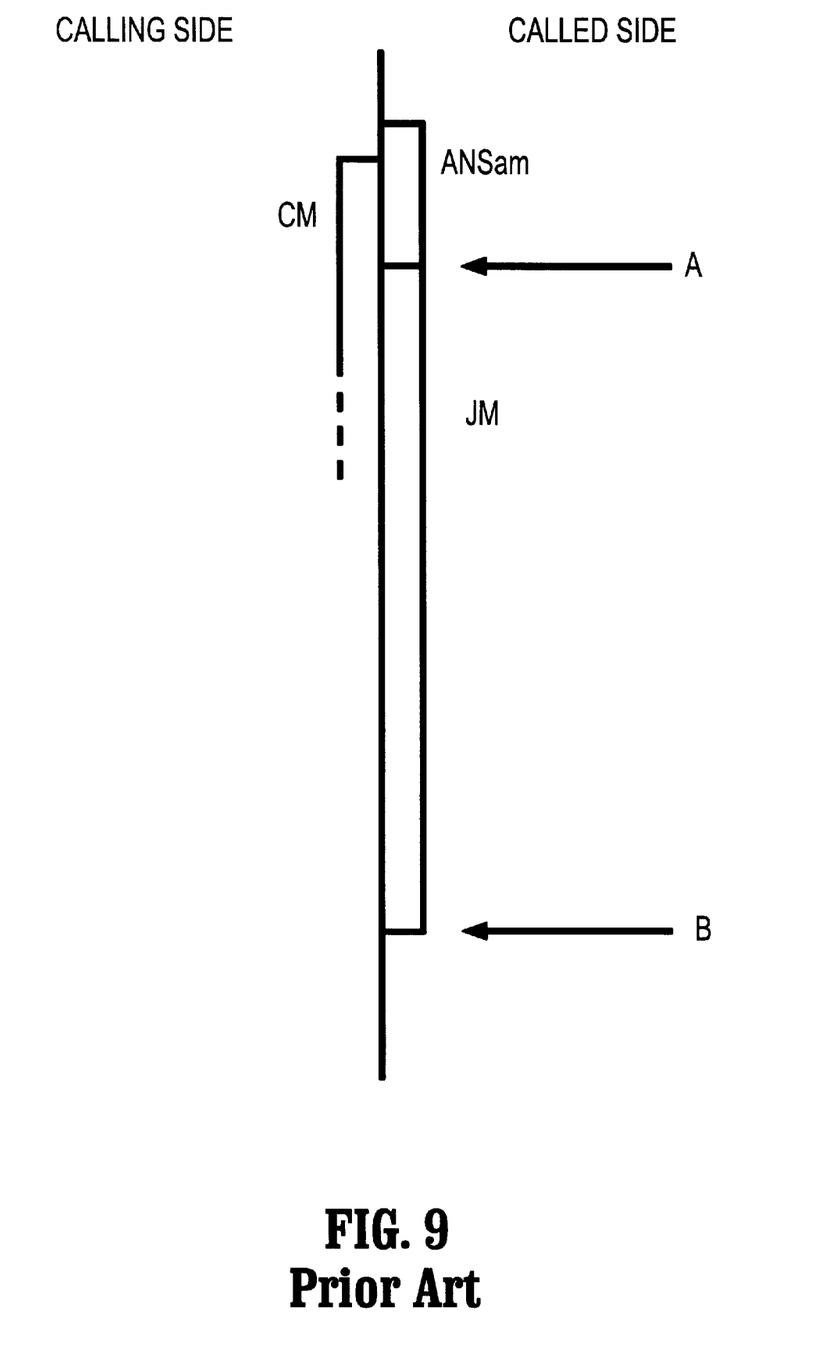
FIG. 9 is an illustration for explaining another with respect to a communications procedure when a facsimile apparatus fails to receive a CJ signal.

Another example is illustrated in FIG. 9, in which a called facsimile apparatus becomes unable to receive the CJ following the CM by any reason after starting the timer T1 during the V.8 procedure. In this case, the called facsimile apparatus continues to send the JM until the time out period preset, to 35 seconds, is passed. After the time-out period of 35 seconds, a relatively long time to wait, the state is then regarded as a communications failure. In FIG. 9, the start of the timer T1 is indicated by the arrow A and the time-out of the timer T1 is indicated by the arrow B.

As described one problem with current V.8 communication procedures is that communication terminals are unable to avoid a communications failure resulting in a line disconnection when the preset time-out period T1 measured by the timer to occur during V.8 communications procedure. Another problem is that with current the V.8 communications procedure time is wasted by waiting for the time-out to occur.

SUMMARY

The present application provides a communications data terminal apparatus that includes a first communications controller performing communications functions including V.8 and V.34 procedures, and a second communications controller performing a modem function having a data signaling rate slower than that of said first communications controller. A timer counts a predetermined time period when the first communications controller sends a CM signal during a time when the apparatus is in a calling mode. The timer also counts a predetermined time period when the first communications controller sends a JM signal during a time when the apparatus is in a receiving mode.

When the apparatus is in the calling mode a system controller is used to determine whether the first communications controller receives the JM signal from a remote data terminal apparatus within the predetermined time, and to stop the first communications controller from sending the CM signal and initiate an operation of the second communications controller so as to receive a DIS signal when the first communications controller is found to have failed to receive said JM signal within the predetermined time.

When the apparatus is in the receiving mode the system controller is used to determine whether the first communications controller receives the CJ signal within the predetermined time, and to stop the first communications controller from sending the JM signal and initiate an operation of the second communications controller so as to send the DIS signal when the first communications controller is found to have failed to receive the CJ signal within the predetermined time.

Preferably, predetermined time period is no greater than three seconds. Further, second communications controller preferably uses V.17 modem communications procedure.

The apparatus may also include a first memory that stores CM flag data that indicates whether a transmission of a CM signal is interrupted. A second memory may be used to store V.8 flag data that indicates whether the apparatus is using V.8 communications procedure. Typically, the V.8 flag data is included in the DIS/NSF signals. In this embodiment, when the apparatus is in the calling mode, the system controller can also stop the first communications controller from sending a CI signal and initiate the operation of the second communications controller so as to send a DCS signal even when the V.8 flag bit indicates that the apparatus is communicating with the V.8 procedure and when the CM flag data indicates that the transmission of the CM signal is interrupted.

This application is based on Japanese Patent Application No. JPAP09-160547 filed in the Japanese Patent Office on Jun. 3, 1997, of which entire contents are hereby incorporated by reference.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein.

DETAILED DESCRIPTION

In describing preferred embodiments of the present application illustrated in the drawings, specific terminology is employed. However, the present application is not intended to be limited to the specific terminology so selected and it is to be understood that each specific element includes all technical equivalents which operate in a similar manner.

Figure 1:
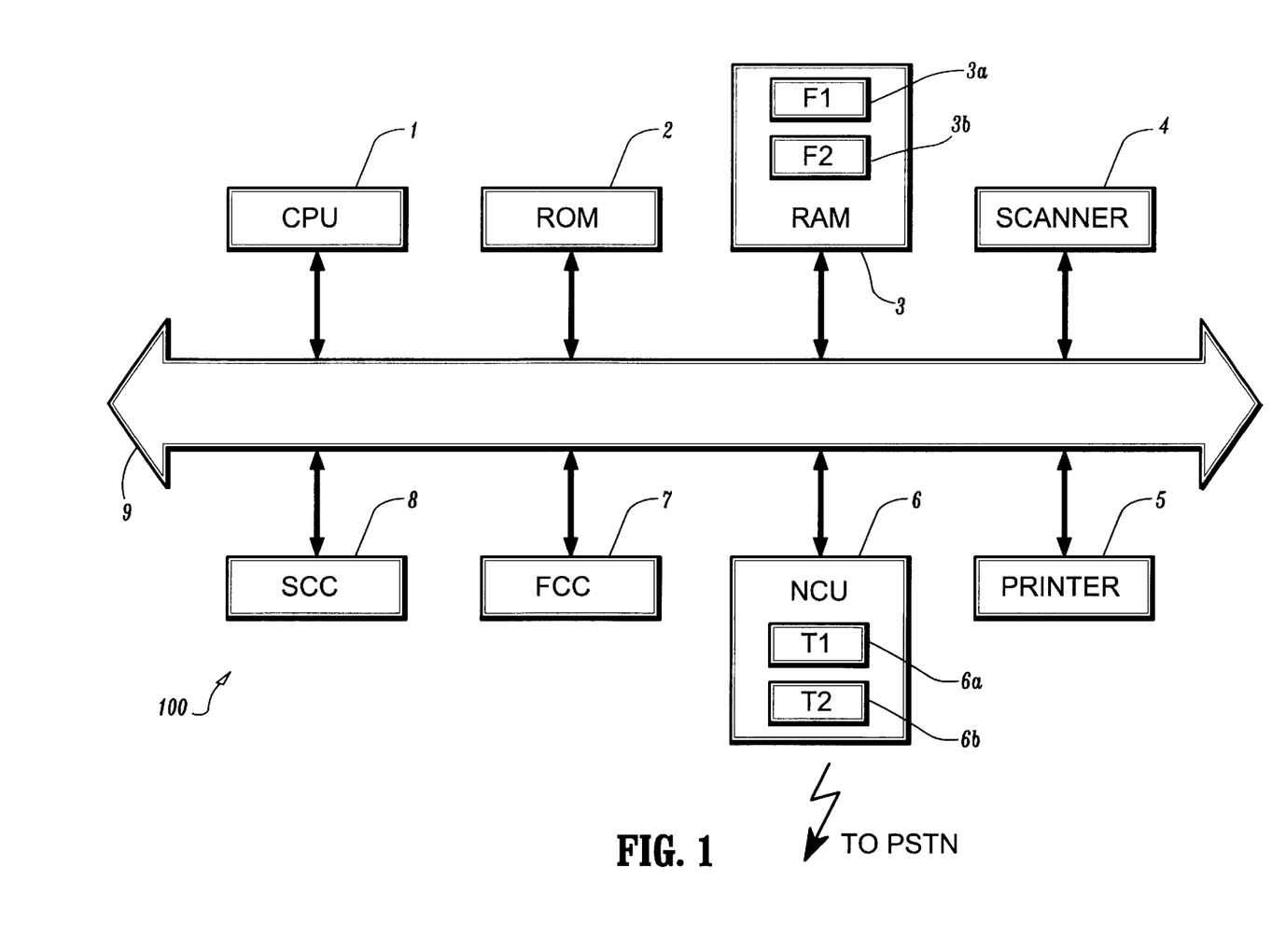
FIG. 1 is a block diagram of a facsimile apparatus according to the present application.

Referring now to the drawings, wherein like reference numerals designate identical or corresponding parts throughout the several views, and more particularly to FIG. 1 thereof, in which a block diagram of an exemplary facsimile apparatus 100 is illustrated. The facsimile apparatus of FIG. 1 includes a CPU (central processing unit) 1, a ROM (read only memory) 2, a RAM (random access memory) 3 that includes a CM interrupt flag (F1) 3a and a V.8 valid flag (F2) 3b, a scanner 4, a printer 5, an NCU (network control unit) 6 that includes a timer 6a and a timer 6b, a first communications controller (FCC) 7, a second communications controller (SCC) 8, and an internal bus 9.

The CPU 1 controls the operation of the facsimile apparatus 100 and, specifically, performs various kinds of communication controls, including a facsimile data transmission control for transmitting and receiving image information. The ROM 2 stores control programs to be executed by the system controller 1 and corresponding data used when executing the control programs. The RAM 3 stores various kinds of parameters and information specific to the facsimile apparatus 100. In addition, the RAM 3 includes a working memory area reserved for use by the CPU 1. The CM flag (F1) 3a and the V.8 flag (F2) 3b both included in the RAM 3 are each one-bit flags that indicate the status of the CM signal and the validity of the V.8 procedure, respectively.

The scanner 4 reads an image of document at a predetermined resolution, and the printer 5 produces an image output at a predetermined resolution. The NCU 6 controls the connection of the facsimile apparatus 100 to other facsimile machines through the PSTN so as to transmit and receive image information to and from other facsimile machines. The NCU 6 includes timer 6a which counts a predetermined time T1, e.g., 35 seconds, and timer 6b which counts another predetermined time T2 that is shorter than the time T1. T2 can be for example 3 seconds.

The FCC 7 functions as a V.17 modem for transmitting and receiving image information. Alternatively other modems having a data signaling rate equal to or slower than the V.17 modem may also be used.

The SCC 8 functions as the V.34 modem for transmitting and receiving image information.

The internal bus 9 is connected to all of the above-described units of the facsimile apparatus 100 and allows communications between these units.

In this way, one of the preferred structures of the facsimile apparatus 100 of the present invention is arranged.

Figure 2:
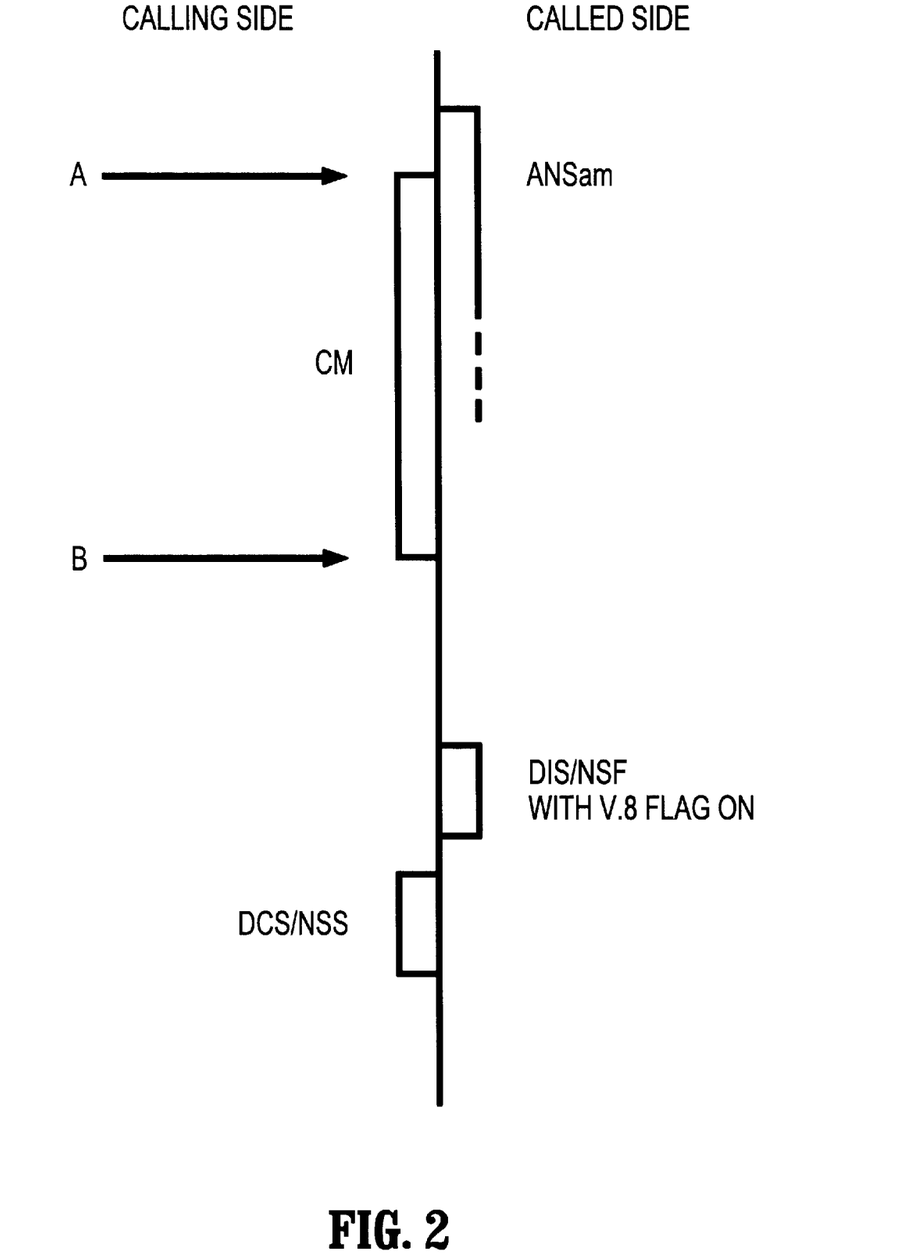
FIG. 2 is an exemplary communications procedure of the facsimile apparatus of FIG. 1 when the apparatus fails to receives the JM signal within a time period.

Referring to FIG. 2, an exemplary representation of the start-up operation of the facsimile apparatus 100 is provided for instances when a calling facsimile apparatus is sending a call but receives no JM signal during the V.8 start-up procedure. In the facsimile apparatus 100, a time period for receiving the JM signal is managed using the timer 6b which is set to a time T2 of for example three seconds, as described above. As illustrated in FIG. 2, when sending a call, the facsimile apparatus 100 activates the SCC 8 to initiate the V.8 start-up procedure and starts the timer at a time indicated by the arrow A in the V.8 start-up procedure so as to check if the JM signal arrives during the time of sending the CM signal for the time T2. When detecting no arrival of the JM signal, the calling facsimile apparatus 100 determines to change the data transmission mode from the very high speed transmission to the regular speed transmission, that is, the calling facsimile apparatus 100 quits the V.8 start-up procedure which leads to the V.34 modem procedure and, at a timing indicated by the arrow B in FIG. 2, activates the FCC 7 to fall back to the V.17 modem start-up procedure.

Accordingly, even if the called facsimile apparatus sends a DIS signal (digital identification signal) and an NSF (non-standard facilities), the calling facsimile apparatus 100 does not send a CI signal (call indicator) that restarts the V.8 start-up procedure and, instead, sends back a DCS signal (digital command signal) and an NSS signal (non-standard set-up).

The above-mentioned DIS signal includes a V.8 flag bit to reflect the value of the V.8 flag F2 of the called facsimile apparatus to indicate that the called facsimile apparatus accepts the V.8 start-up procedure. For the sake of convenience, the DIS signal and the following NSF signal and the DCS signal and the NSS signal are abbreviated hereinafter as the DIS/NSF and the DCS/NSS, respectively.

During the above-described procedure, the facsimile apparatus 100 is preferably be capable of sending the CM and receiving the DIS/NSF simultaneously in the full duplex data transmission mode. In this way, the facsimile apparatus 100 can change the data transmission mode from the V.8 procedure followed by the V.34 procedure to the V.17 procedure by swiftly detecting an event of receiving no JM during the V.8 procedure, so as to avoid waiting for the T1 time-out to occur, and the resultant line disconnection caused by a communications failure.

Figure 3:
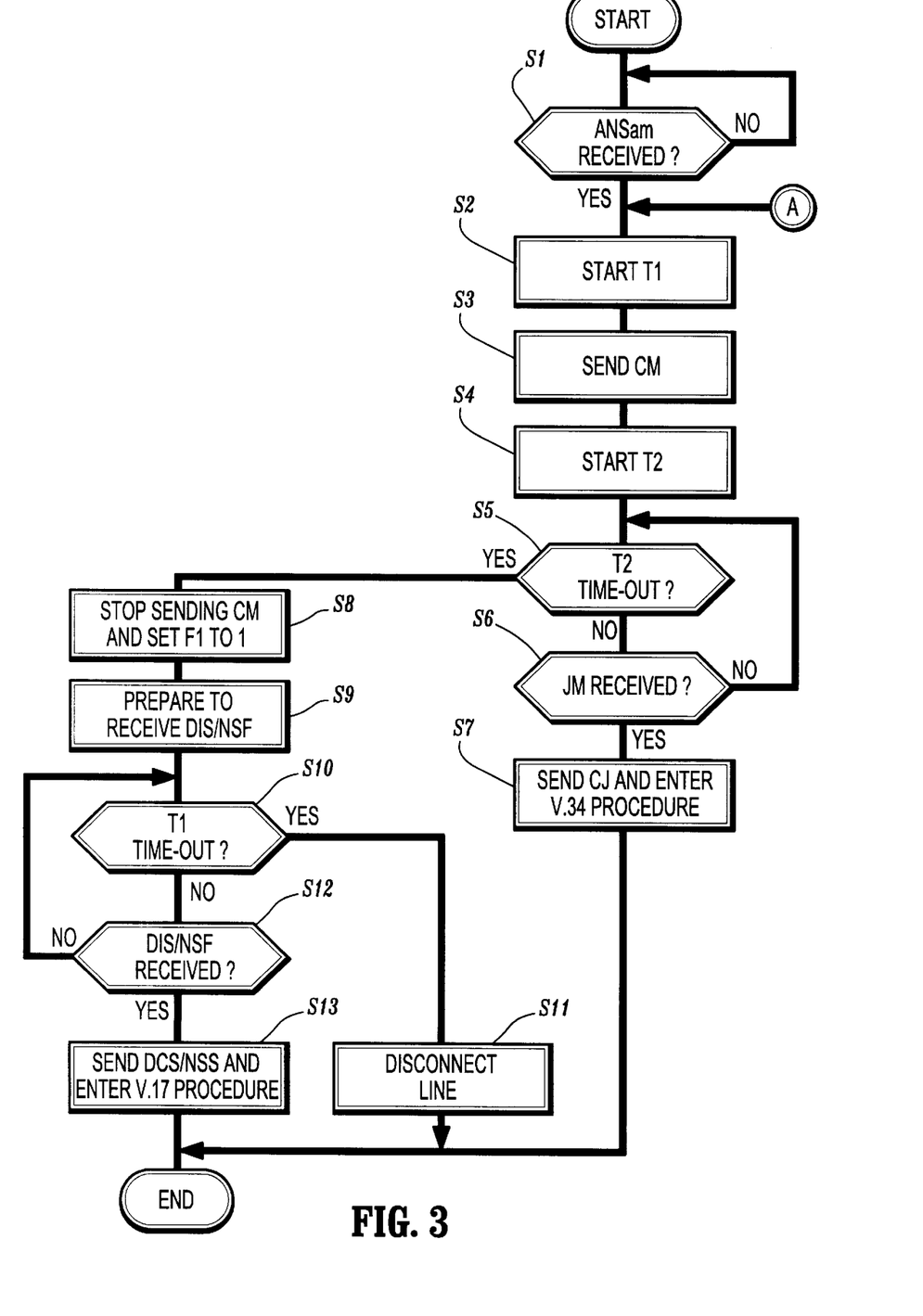
FIG. 3 is a flowchart explaining the exemplary communications procedure illustrated in FIG. 2.

Next, a flowchart of the above-described exemplary operation of the facsimile apparatus 100 when sending a call but receiving no JM for the T2 time period during the V.8 procedure is explained with reference to FIG. 3. In this embodiment, the timer 6b is set so that T2 is three seconds. In Step S1 of FIG. 3, the CPU 1 of the facsimile apparatus 100 which has activated the SCC 8 checks if the NCU 6 receives the ANSam. Since Step S1 forms a NO return loop, the process wait until the NCU 6 receives the ANSam and then proceeds to step S2. In Steps S2, S3, and S4, the NCU 6 sequentially performs operations of starting the T1 time-out period count using timer 6a, sending the CM signal generated by the SCC 8, and starting the T2 time-out count using timer 6b, respectively. Then, in Step S5, the CPU 1 checks if the T2 time-out occurs. If no T2 time-out occurs and the check result of Step 5S is NO, the process proceeds to Step S6 and the CPU 1 checks if the SCC 8 receives the JM signal through the NCU 6. If the SCC 8 does not receive the JM signal the process returns to Step S5, and if the SCC 8 receives the JM signal the process proceeds to Step S7. Then, in Step S7, the SCC 8 generates the CJ to send it through the NCU 6, so that the process can enter the V.34 procedure.

If in step S5 the T2 time-out occurs and the check result of Step S5 is YES, the process proceeds to Step S8 and the CPU 1 stops sending the CM and sets the CM flag F1 stored in the RAM 3 to 1 (on). Then, in Step S9, the CPU 1 activates the FCC 7 in order to prepare to receive the DIS/NSF through the NCU 6.

In Step S10, the CPU 1 checks if the T1 time-out occurs. If the T1 time-out occurs and the check result of Step S10 is YES, the process proceeds to Step S11 and the CPU 1 instructs the NCU 6 to disconnect the line.

If in step S10 no T1 time-out occurs and the check result of Step S10 is NO, the process proceeds to Step S12 and the CPU 1 checks if the FCC 7 receives the DIS/NSF through the NCU 6. While if the FCC 7 does not receive the DIS/NSF and the check result of Step S12 is NO, the process returns to Step S10, if the FCC 7 receives the DIS/NSF and the check result of Step S12 is YES, the process proceeds to Step S13 and the FCC 7 generates the DCS/NSS to send it through the NCU 6, regardless of the value of the V.8 flag bit in the DIS/NSF. Then, the FCC 7 enters the V.17 modem procedure.

Thus, the facsimile apparatus 100 uses the timer T2 to limit a time to check the receipt of the JM signal during the V.8 start-up procedure and, when no JM signal is received changes the data transmission mode from the V.8 start-up procedure followed by the V.34 procedure to the V.17 start-up procedure. As a result, time wasting that occurs by waiting for the T1 time-out to occur is avoided, and the resultant line disconnection caused by a communications failure is also avoided.

Figure 4:
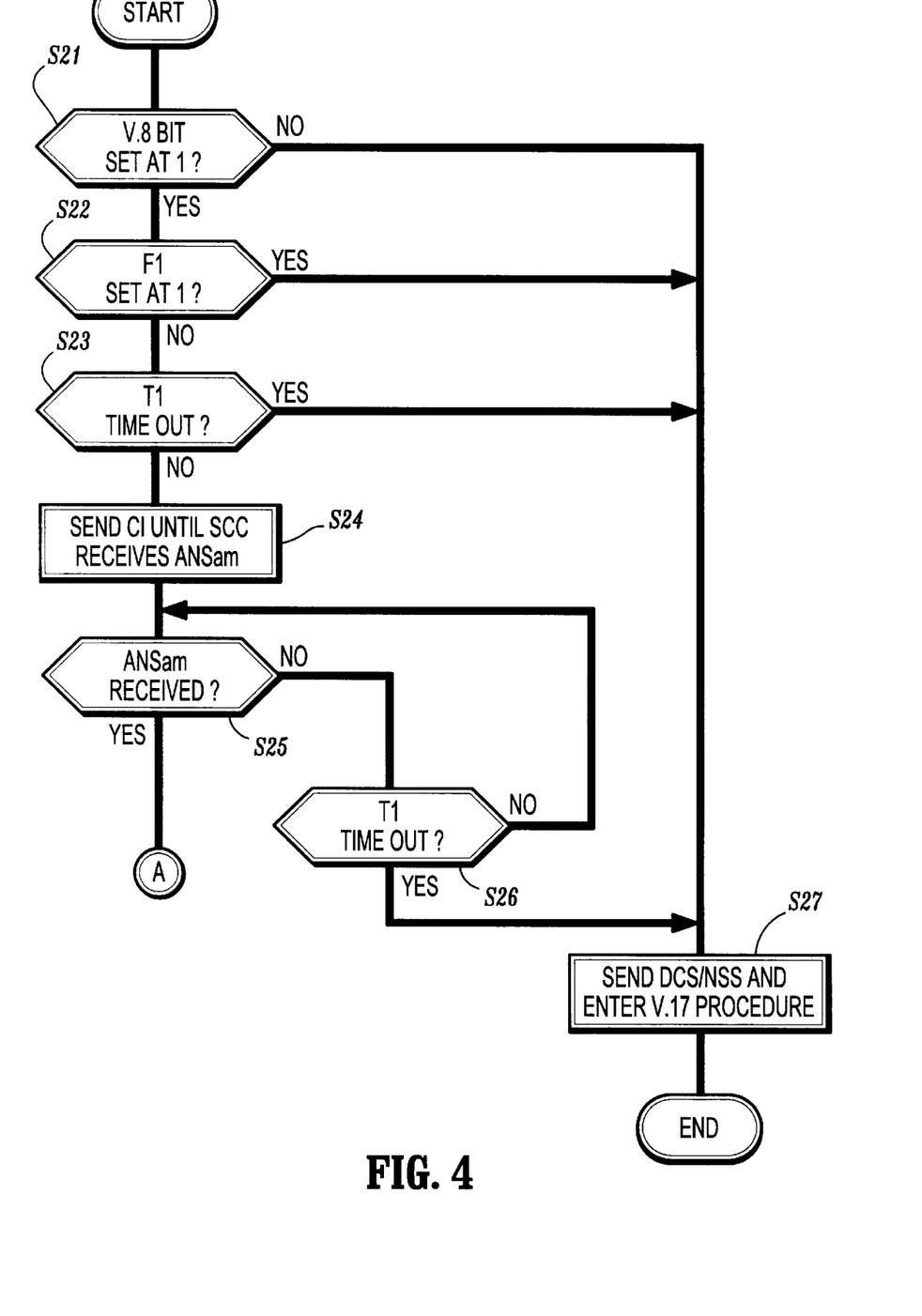
FIG. 4 is a flowchart explaining an alternative procedure a portion of the flowchart of FIG. 3.

Alternatively, the action performed in Step S13 of FIG. 3 can be replaced with other actions which will be explained with reference to FIG. 4. In Step S21 of FIG. 4, the CPU 1 checks if the V.8 flag bit included in the DIS/NSF is set at 1. When the V.8 flag bit of the DIS/NSF is set at 1 and the check result of Step S21 is YES, the process proceeds to Step S22 and the CPU 1 further checks if the CM flag F1 stored in the RAM 3 is set at 1. If the CM flag F1 is not set at 1 and the check result of Step S22 is NO, the process proceeds to Step S23 and the CPU 1 checks if the T1 time-out occurs. If no T1 time-out occurs and the check result of Step S23 is NO, the process proceeds to Step S24 and the SCC 8 generates the CI signal to send it through the NCU 6 in order to receive the ANSam. The process then proceeds to Step S25 and the CPU 1 checks if the SCC 8 receives the ANSam signal. When the SCC 8 received the ANSam signal and the check result of Step S25 is YES, the process proceeds to the V.8 protocol exchange procedure which is indicated by a letter A in a circle of FIG. 4.

When in step S25 the SCC 8 receives no ANSam signal, the process proceeds to Step S26 and the CPU 1 checks again the T1 time-out. If the T1 time-out has not occurred, the process returns to Step S25 in order to check again whether the ANSam signal has been received. If the T1 time-out occurs, the process proceeds to Step S27 in which the FCC 7 sends the DCS/NSS and enters the V.17 communication procedure.

When in step S21 the V.8 flag bit of the DIS/NSF is not set at 1, the process proceeds to Step S27 where the FCC 7 generates the DCS/NSS to send through the NCU 6 to enter the V.17 modem start-up procedure. Then, the CPU 1 activates the FCC 7 for communications using the V.17 procedure.

When in step S22 the CM flag F1 is set at 1, the process proceeds to Step S27 where the FCC 7 generates the DCS/NSS to send it through the NCU 6 to enter the V.17 modem start-up procedure. Then, the CPU 1 activates the FCC 7 for communications using the V.17 procedure.

When in step S23 the T1 time-out occurs, the process proceeds to Step S27 where the FCC 7 generates the DCS/NSS to send through the NCU 6 to enter the V.17 modem start-up procedure. Then, the CPU 1 activates the FCC 7 for communications using the V.17 procedure.

In this way, the facsimile apparatus 100 uses the CM and V.8 flags to determine whether or not to start the V.8 procedure again during the aforementioned exemplary operation while still avoiding wasting time by waiting for the T1 time-out to occur, and the resultant line disconnection caused by a communications failure.

Figure 5:
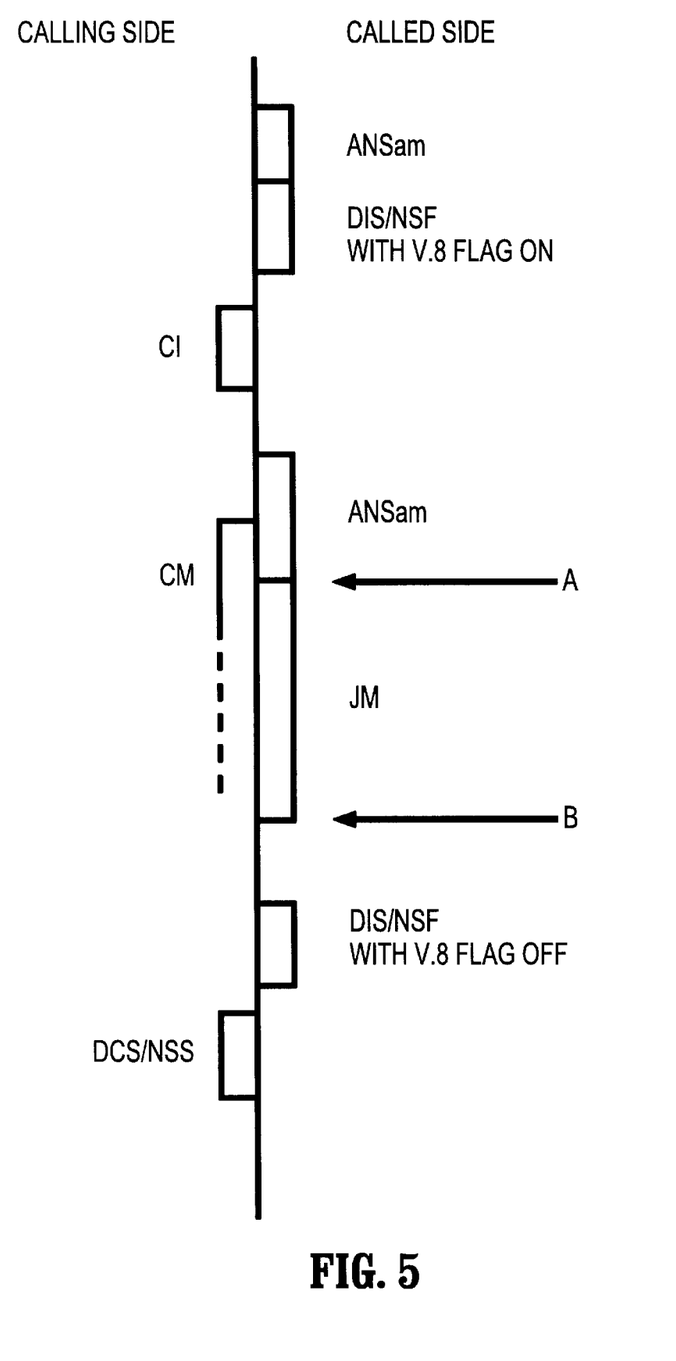
FIG. 5 is another exemplary communications procedure of the facsimile apparatus of FIG. 1 when the apparatus fails to receives the CJ signal within a time period.

Referring now to FIG. 5, an exemplary representation of the start-up operation of the facsimile apparatus 100 is provided for instances when a facsimile apparatus receiving a call receives no CJ signal during the time of sending the JM signal in the V.8 start-up procedure. In the facsimile apparatus 100, a time period for receiving the CJ signal is limited by the timer 6b (seen in FIG. 1) which is set to a time T2, e.g., three seconds, as described above. As illustrated in FIG. 5, when receiving a call, the facsimile apparatus 100 that has activated the SCC 8 starts the timer 6b at a time indicated by the arrow A in the V.8 procedure so as to check if the CJ signal arrives during the time of sending the JM signal for the time T2. When detecting no arrival of the CJ signal in the above-mentioned time T2, the called facsimile apparatus 100 determines that the T2 time-out has occurred. Then, the called facsimile apparatus 100 stops the SCC 8 to quit the V.8 start-up procedure followed by the V.34 modem procedure and starts the FCC 7 to fall back to the V.17 modem start-up procedure at a timing indicated by the arrow B in FIG. 5. After the time-out T2, the called facsimile apparatus 100 sets the V.8 flag F2 to 0 (off) in order to set the V.8 flag bit of the DIS/NSF to 0 (off). However, the called facsimile apparatus 100 still sends the ANSam signal upon receiving the CI signal. In this case, although the calling facsimile apparatus receives the ANSam signal, it will receive next the DIS/NSF having the V.8 flag bit set at 0 (off), so as to avoid wasting time trying to resume the V.8 procedure.

In this way, the facsimile apparatus 100 can swiftly detect an occurrence of receiving no CJ signal during the V.8 procedure and inform the calling side of this occurrence so that the calling side can avoid wasting time by waiting for the T1 time-out to occur, and the resultant line disconnection caused by a communications failure.

Figure 6:
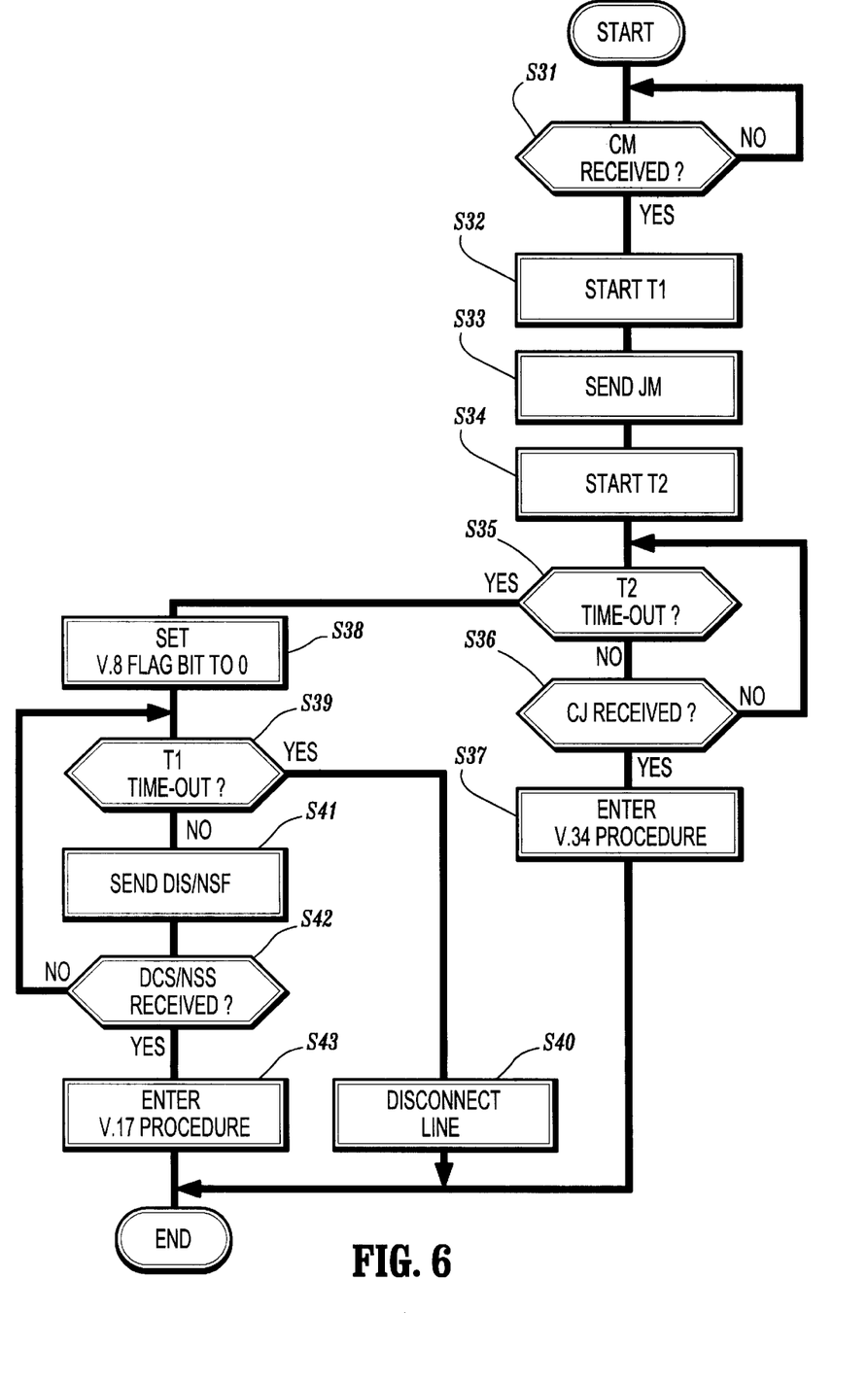
FIG. 6 is a flowchart explaining the exemplary communications procedure illustrated in FIG. 5.

Next, a flowchart of the above-described exemplary operation of the facsimile apparatus 100 when receiving a call but receiving no CM signal within the T2 time period during the time of sending the JM signal in the V.8 start-up procedure is explained with reference to FIG. 6. In Step S31 of FIG. 6, the CPU 1 of the receiving facsimile apparatus 100 checks if the SCC 8 receives the CM signal through the NCU 6. Since Step S31 forms a NO return loop, the process waits until the SCC 8 receives the CM signal through the NCU 6 and then proceeds to Step S32. In Steps S32, S33, and S34, the NCU 6 sequentially performs operations of starting the T1 time-out period count using timer 6a, sending the JM signal generated by the SCC 8, and starting the T2 time-out period count using timer 6b, respectively. Then, in Step S35, the CPU 1 checks if the T2 time-out occurs. When no T2 time-out occurs and the check result of Step S35 is NO, the process proceeds to Step S36 and the CPU 1 checks if the SCC 8 receives the CJ through the NCU 6. If the SCC 8 does not receive the CJ the process returns to Step S35, and if the SCC 8 receives the CJ the process proceeds to Step S37 and the SCC 8 enters the V.34 procedure.

When in Step S35 the T2 time-out occurs and the check result of Step S35 is YES, the process proceeds to Step S38 and the CPU 1 stops the SCC 8 to quit the V.8 procedure that initiates the V.34 procedure and starts the FCC 7 in order to start the V.17 procedure. At the same time, the CPU 1 sets the V.8 flag F2 stored in the RAM 3 to 0 (off). Then, in Step S39, the CPU 1 checks if the T1 time-out occurs. When the T1 time-out occurs and the check result of Step S39 is YES, the process proceeds to Step S40 and the CPU 1 instructs the NCU 6 to disconnect the line.

When in Step S39 no T1 time-out occurs and the check result of Step S39 is NO, the process proceeds to Step S41 and the FCC 7 generates the DIS/NSF including the V.8 flag bit that has been set to 0 (off) to be sent through the NCU 6. Then, in Step S42, the CPU 1 checks if the FCC 7 receives the DCS/NSS through the NCU 6. If the FCC 7 does not receive the DCS/NSS and the check result of Step S42 is NO, the process returns to Step S39. If the FCC 7 receives the DCS/NSS and the check result of Step S42 is YES, the process proceeds to Step S43 and the FCC 7 enters the V.17 procedure.

In this way, the facsimile apparatus 100 can swiftly detect an occurrence of receiving no CJ signal during the V.8 procedure and inform the calling side of this occurrence so that the calling side can avoid wasting time by waiting for the T1 time-out to occur and the resultant line disconnection caused by a communications failure.

Figure 7:
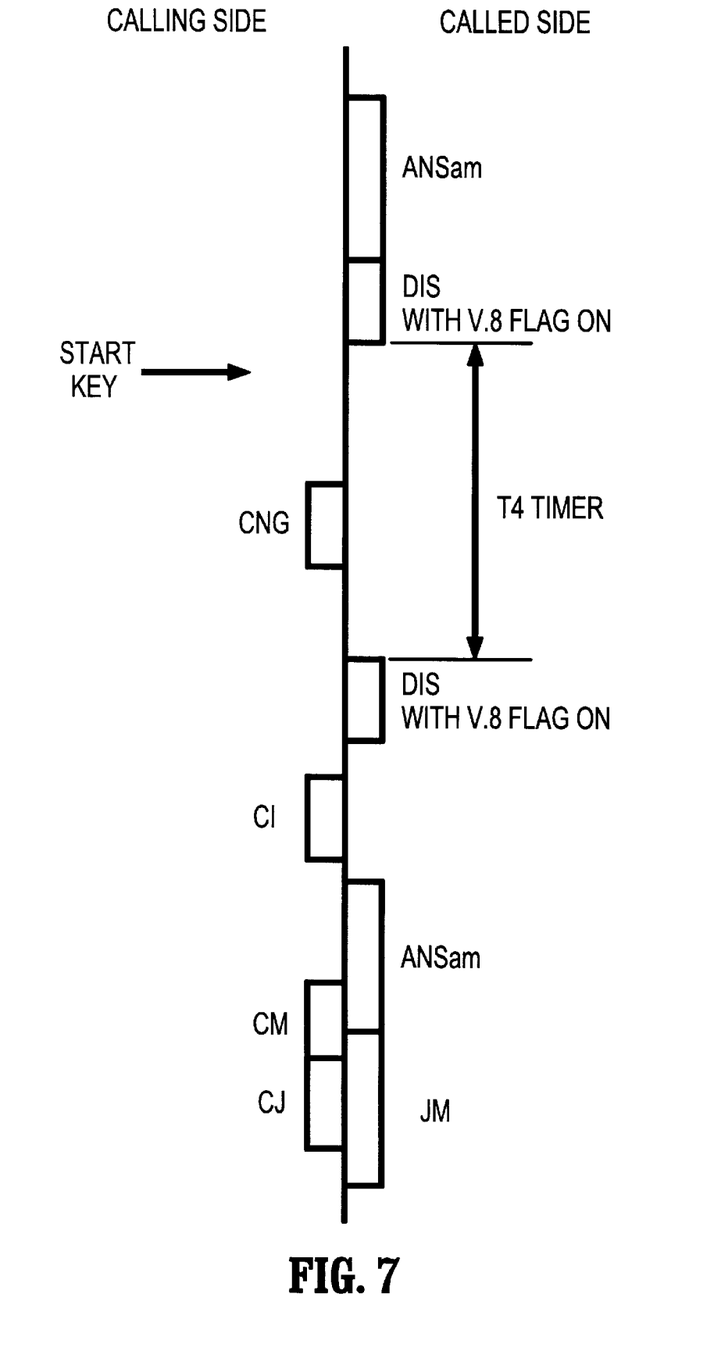
FIG. 7 is an exemplary communications procedure of manual data transmission performed by the facsimile apparatus of FIG. 1 when the apparatus fails to receives a first ANSam signal due to a late instruction for starting a transmission.

Next, an example of a manual transmission operation performed between calling and called facsimile apparatus 100 is explained with reference to FIG. 7. In the manual transmission operation, the calling and called facsimile apparatus establish a communication session and, then, the calling facsimile apparatus needs to start data transmission by pressing a start key, for example. Then, the called side sends the ANSam signal. Usually, the time period between the establishment of the session and the sending of the ANSam signal is, for example, about two seconds. Therefore, at the calling facsimile apparatus, the start key may be pressed after the called facsimile apparatus sends the above-mentioned ANSam signal making it possible that the calling facsimile apparatus may miss the ANSam signal so that the V.8/V.34 procedure can not be performed.

In addition, since the called facsimile apparatus usually does not know if the calling facsimile apparatus has a V.8/V.34 modem or a V.17 modem, the called facsimile apparatus in this embodiment sends the ANSam signal and the DIS signal. Further, the called facsimile apparatus repeats sending the DIS signal at a predefined time interval T4 in order to allow the calling facsimile apparatus to receive to the DIS signal. Since the DIS signal includes the V.8 flag bit that is set on, the calling facsimile apparatus can proceed with either the V.8/V.34 procedure or the V.17 procedure upon receiving the DIS signal, depending upon the capability thereof.

Therefore, even if the calling facsimile apparatus fails to receive the ANSam signal, it can receive the DIS signal having the V.8 flag set on and subsequently send the CI signal in order to start the V.8 procedure. Upon receiving the CI signal, the called facsimile apparatus sends the second ANSam signal.

In addition, the determination whether to send the ANSam signal during the manual transmission mode is an option at the called facsimile apparatus. Therefore, the first ANSam signal seen in FIG. 7 may not be sent. However, the called facsimile apparatus side responds to receiving the CI signal by sending the second ANSam signal, regardless of whether the called facsimile apparatus is in the manual transmission mode or not.

Further, in addition, the called facsimile apparatus side sets the V.8 flag F2 to 1 (on) in order to set the V.8 flag bit of the DIS signal to 1 (on), so that the calling facsimile apparatus can properly respond if the ANSam signal is missing when operating in the automatic transmission mode or the manual transmission mode.

In this way, the facsimile apparatus 100 can perform the V.8 procedure even if it fails to receive the ANSam signal during the manual transmission operation, which normally leads to a communications failure.

The embodiments of the present application may be conveniently implemented using a conventional general purpose digital computer programmed according to the teachings of the present specification, as will be apparent to those skilled in the art. Appropriate software coding can readily be prepared based on the teachings of the present disclosure, as will be apparent to those skilled in the art. The embodiments of the present application may also be implemented by the preparation of application specific integrated circuits or by interconnecting an appropriate network of conventional component circuits, as will be readily apparent to those skilled in the art.

Numerous additional modifications and variations of the present invention are possible in light of the above teachings. It is therefore to be understood that within the scope of the appended claims, the present invention may be practiced otherwise than as specifically described herein.

What I claim is:

1. A communications data terminal apparatus, comprising:
   a first communications controller performing communications functions including V.8 and V.34 procedures;
   a second communications controller performing a modem function having a data signaling rate slower than that of said first communications controller;
   a timer that starts to count a predetermined time period when said first communications controller starts sending a CM signal during a time when said apparatus is in a calling mode, or when said first communications controller starts sending a JM signal during a time when said apparatus is in a receiving mode; and
   a system controller that:
      determines whether the first communications controller receives said JM signal from a remote data terminal apparatus within said predetermined time period counted by said timer and that stops operation of said first communications controller so as to stop sending said CM signal and initiates an operation of said second communications controller so as to receive a DIS signal when the first communications controller does not receive said JM signal within said predetermined time period, during said time when said apparatus is in said calling mode; and
      determines whether the first communications controller receives a CJ signal within said predetermined time period counted by said timer and that stops the operation of said first communications controller so as to stop sending said JM signal and initiates an operation of said second communications controller so as to send said DIS signal when the first communications controller does not receive said CJ signal within said predetermined time period, during said time when said apparatus is in said receiving mode.

2. The communications data terminal apparatus according to claim 1, wherein said predetermined time period is no greater than three seconds.

3. The communications data terminal apparatus according to claim 1, further comprising:
   a first memory storing CM flag data indicating whether a transmission of a CM signal is interrupted; and
   a second memory storing V.8 flag data indicating that said apparatus is performing the V.8 procedure, said V.8 flag data being reflected in a V.8 flag bit included in DIS/NSF signals,
   and wherein, when said apparatus is in said calling mode, said system controller stops the operation of said first communications controller so as to stop sending a CI signal and initiates the operation of said second communications controller so as to send a DCS signal even when said V.8 flag bit included in said DIS/NSF signals indicates that said apparatus is performing the V.8 procedure and when said CM flag data indicates that the transmission of the CM signal is interrupted.

4. The communications data terminal apparatus according to claim 1, wherein said system controller resets said V.8 flag data stored in said second memory after stopping sending said JM signal by stopping the operation of said first communications controller, so as to make said V.8 flag bit of the DIS/NSF signals off to indicate that said apparatus is not performing the V.8 procedure.

5. The communications data terminal apparatus according to claim 1, wherein said second communications controller performs V.17 modem communications procedure.

6. A communications data terminal apparatus, comprising:
   first communications controlling means for performing communications functions including V.8 and V.34 procedures;
   second communications controlling means for performing a modem function having a data signaling rate slower than that of said first communications controlling means;
   timing means for counting a predetermined time period when said first communications controlling means starts sending a CM signal during a time when said apparatus is in a calling mode, or when said first communications controlling means starts sending a JM signal during a time when said apparatus is in a receiving mode; and
   system controlling means for:
      determining whether the first communications controlling means receives said JM signal from a remote data terminal apparatus within said predetermined time period counted by said timing means and stopping operation of said first communications controlling means so as to stop sending said CM signal and initiating an operation of said second communications controlling means so as to receive a DIS signal when the first communications controlling means does not receive said JM signal within said predetermined time during said time when said apparatus is in said calling mode; and
      determining whether the first communications controlling means receives a CJ signal within said predetermined time period counted by said timing means and stopping the operation of said first communications controlling means so as to stop sending said JM signal and initiating an operation of said second communications controlling means so as to send said DIS signal when the first communications controlling means does not receive said CJ signal within said predetermined time, during said time when said apparatus is in said receiving mode.

7. The communications data terminal apparatus according to claim 6, wherein said predetermined time period counted by said timing means is no greater than three seconds.

8. The communications data terminal apparatus according to claim 6, further comprising:
   first storing means for storing CM flag data indicating whether a transmission of a CM signal is interrupted; and
   second storing means for storing V.8 flag data indicating that said apparatus is performing the V.8 procedure, said V.8 flag data being reflected in a V.8 flag bit included in DIS/NSF signals,
   and wherein when said apparatus is in said calling mode, said system controlling means stops the operation of said first communications controlling means so as to stop sending a CI signal and initiates the operation of said second communications controlling means so as to send a DCS signal even when said V.8 flag bit included in said DIS/NSF signals indicates that said apparatus is performing the V.8 procedure and when said CM flag data indicates that the transmission of the CM signal is interrupted.

9. The communications data terminal apparatus according to claim 6, wherein said system controlling means resets said V.8 flag data stored in said second storing means after stopping sending said JM signal by stopping the operation of said first communications controlling means, so as to make said V.8 flag bit of the DIS/NSF signals off to indicate that said apparatus is not performing the V.8 procedure.

10. The communications data terminal apparatus according to claim 6, wherein said second communications controlling means performs V.17 modem communications procedure.

11. A method of a communications control executed by a communications data terminal apparatus, comprising the steps of:

when in a calling mode,
  counting a predetermined time period from when a first communication controller starts sending a CM signal; and
  determining whether the first communication controller receives a JM signal from a remote data terminal apparatus within said predetermined time period and stopping said first communication controller from sending said CM signal and initiating an operation of a second communication controller so as to receive a DIS signal from the remote data terminal apparatus when the first communication controller does not receive said JM signal within said predetermined time period, and when in a receiving mode,
  counting a predetermined time period when the first communication controller starts sending a JM signal; and
  determining whether the first communication controller receives a CJ signal from a remote data terminal apparatus within said predetermined time period and stopping said first communication controller from sending said JM signal and initiating an operation of the second communication controller so as to send a DIS signal when the first communication controller does not receive said CJ signal within said predetermined time.

12. The method according to claim 11, wherein said predetermined time period is no greater than three seconds.

13. The method according to claim 11, further comprising:
  storing CM flag data indicating whether a transmission of a CM signal is interrupted; and
  storing V.8 flag data indicating that said apparatus is performing a V.8 procedure, said V.8 flag data being reflected in a V.8 flag bit included in DIS/NSF signals,
  and wherein said first communication controller stops sending a CI signal and initiates the operation of said second communication controller so as to send a DCS signal even when said V.8 flag bit included in said DIS/NSF signals indicates that said apparatus is performing the V.8 procedure and when said CM flag data indicates that the transmission of the CM signal is interrupted.

14. A method of a communications control executed by a communications data terminal apparatus when in a receiving mode, comprising:
  counting a predetermined time period when a first communication controller starts sending a JM signal; and
  determining whether the first communication controller receives a CJ signal from a remote data terminal apparatus within said predetermined time period and stopping said first communication controller from sending said JM signal and initiating an operation of a second communication controller so as to send a DIS signal when the first communication controller does not receive said CJ signal within said predetermined time.

15. The method according to claim 14, wherein said predetermined time period is no greater than three seconds.

* * * * *